(12) United States Patent
Sun et al.

(10) Patent No.: US 8,116,186 B2
(45) Date of Patent: Feb. 14, 2012

(54) COLLINEAR HOLOGRAPHIC STORAGE METHOD AND APPARATUS

(75) Inventors: Ching-Cherng Sun, Taoyuan County (TW); Yeh-Wei Yu, Hsinchu County (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 12/862,743

(22) Filed: Aug. 24, 2010

(65) Prior Publication Data
US 2011/0235493 A1    Sep. 29, 2011

(30) Foreign Application Priority Data
Mar. 29, 2010    (TW) .............................. 99109431 A

(51) Int. Cl.
*G11B 7/00*    (2006.01)

(52) U.S. Cl. ....................................................... 369/103
(58) Field of Classification Search ................... 369/103
See application file for complete search history.

(56) References Cited

U.S. PATENT DOCUMENTS

| | | | |
|---|---|---|---|
| 2006/0232841 A1* | 10/2006 | Toishi et al. | 359/24 |
| 2008/0088896 A1* | 4/2008 | Toishi | 359/3 |
| 2008/0316896 A1* | 12/2008 | Usami | 369/103 |
| 2009/0034397 A1* | 2/2009 | Tanaka | 369/103 |
| 2010/0039918 A1* | 2/2010 | Tanaka | 369/103 |

* cited by examiner

*Primary Examiner* — Wayne Young
*Assistant Examiner* — Brenda Bernardi
(74) *Attorney, Agent, or Firm* — CKC & Partners Co., Ltd.

(57) ABSTRACT

In the specification and drawings, a collinear holographic storage method is described and shown with a controlling step to control the temperature of the collinear holographic storage media such that the writing temperature of the collinear holographic storage media is from between about 5° C. to about 50° C. higher than the reading temperature of the collinear holographic storage media.

15 Claims, 8 Drawing Sheets

COLLINEAR HOLOGRAPHIC STORAGE METHOD AND APPARATUS

RELATED APPLICATIONS

This application claims priority to Taiwan Application Serial Number 99109431, filed Mar. 29, 2010, which is herein incorporated by reference.

BACKGROUND

1. Technical Field

The present disclosure relates to holographic data storage. More particularly, the present disclosure relates to collinear holography.

2. Description of Related Art

Holographic data storage is a potential replacement technology in the area of high-capacity data storage. Holographic data storage researched has boomed several times in the past. However, holographic data storage is still a potential replacement technology, not a commercial data storage solution.

Collinear holography is one of the possible solutions for holographic data storage. In collinear holography, the signal beam and the reference beam are collinear and are focused onto the disk by the same lens. Traditionally, the signal beam located on the center surrounded by the reference beam. Collinear holography has a simple structure, a possibility of backwards-compatibility, a shorter optical path difference between the signal beam and the reference beam, a lower requirement for the coherence length of the laser beam, a better shift selectivity, a larger wavelength tolerance, a larger media tilt tolerance, high-capacity data storage, and high speed. Therefore, collinear holography has become the mainstream of holographic data storage.

SUMMARY

According to one embodiment of the present invention, a collinear holographic storage method includes the following steps. Data is written into a collinear holographic storage media. The temperature of the collinear holographic storage media is raised to a predetermined temperature when the data is written into the collinear holographic storage media, wherein the predetermined temperature is from between about 5° C. to about 50° C. higher than room temperature.

According to another embodiment of the present invention, a collinear holographic storage method includes the following steps. Data is written into a collinear holographic storage media. The data is read from the collinear is holographic storage media. The temperature of the collinear holographic storage media is controlled such that the writing temperature of the collinear holographic storage media is from between about 5° C. to about 50° C. higher than the reading temperature of the collinear holographic storage media.

The foregoing steps are not recited in the sequence in which the steps are performed. That is, unless the sequence of the steps is expressly indicated, the sequence of the steps is interchangeable, and all or part of the steps may be simultaneously, partially simultaneously, or sequentially performed.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1:
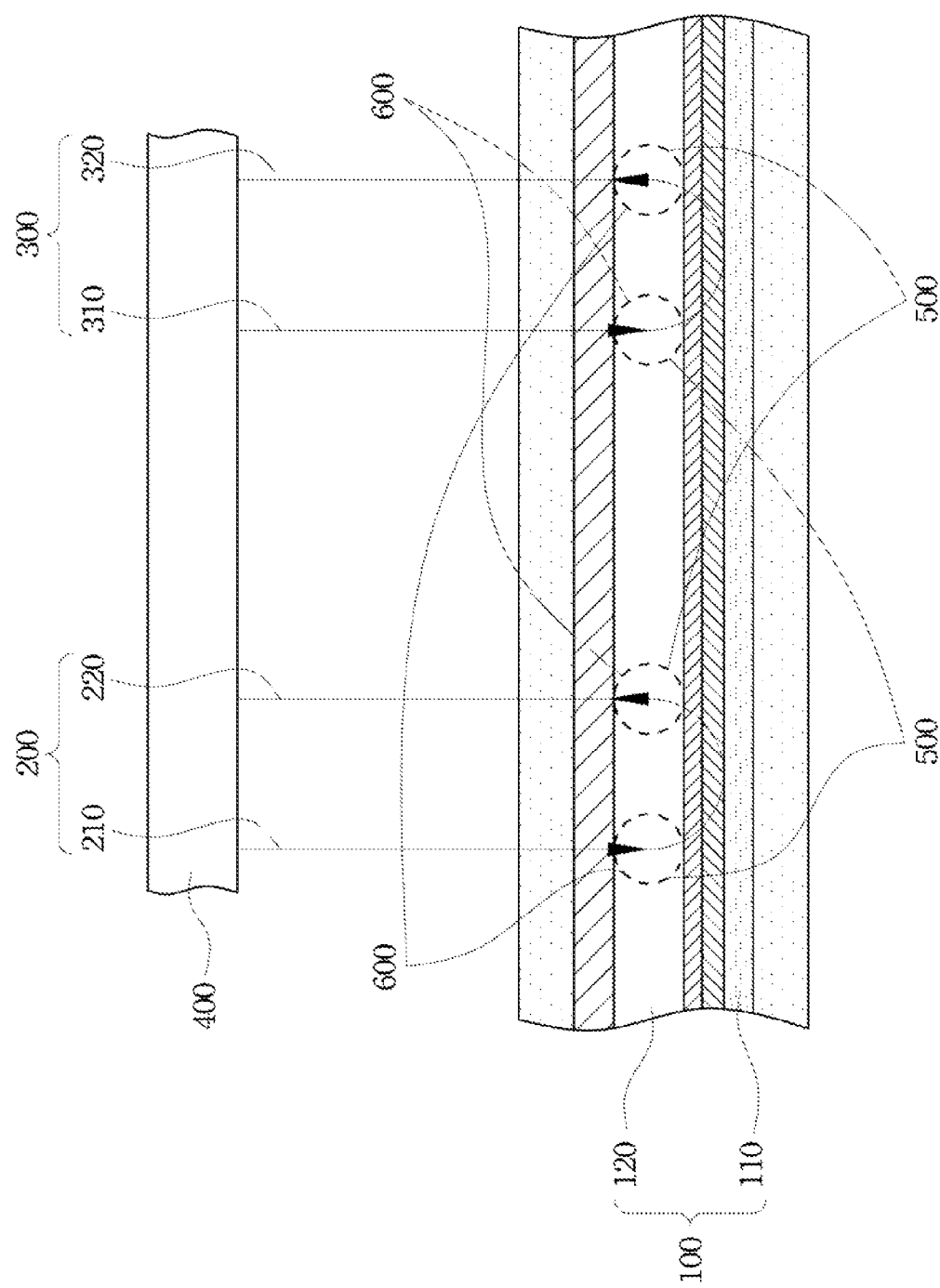
FIG. 1 is a sectional view of a collinear holographic storage media when the data is written according to one embodiment of the present invention.

FIG. 1 is a sectional view of a collinear holographic storage media when the data is written according to one embodiment of the present invention. As show in FIG. 1, the collinear holographic storage media includes a reflection layer 110 and a recording layer 120. The recording layer 120 is disposed above the reflection layer 110.

When the data is written, the user may use a spatial light modulator (SLM) to provide a signal beam 200 and a reference beam 300. At least one lens 400 focuses the signal beam 200 and the reference beam 300 onto the reflection layer 110, thereby creating an interference pattern in the recording layer 120.

As shown in FIG. 1, there are transmission gratings 500 and reflection gratings 600 in the recording layer 120 due to the reflection layer 110. The transmission gratings 500 includes the gratings created by the incident signal beam 210 and the incident reference beam 310 and the gratings created by the reflected signal beam 220 and the reflected reference beam 320. The reflection gratings 600 includes the gratings created by the incident signal beam 210 and the reflected reference beam 320 and the gratings created by the reflected signal beam 220 and the incident reference beam 310. The transmission gratings 500 and the reflection gratings 600 have different physical properties.

Figure 2:
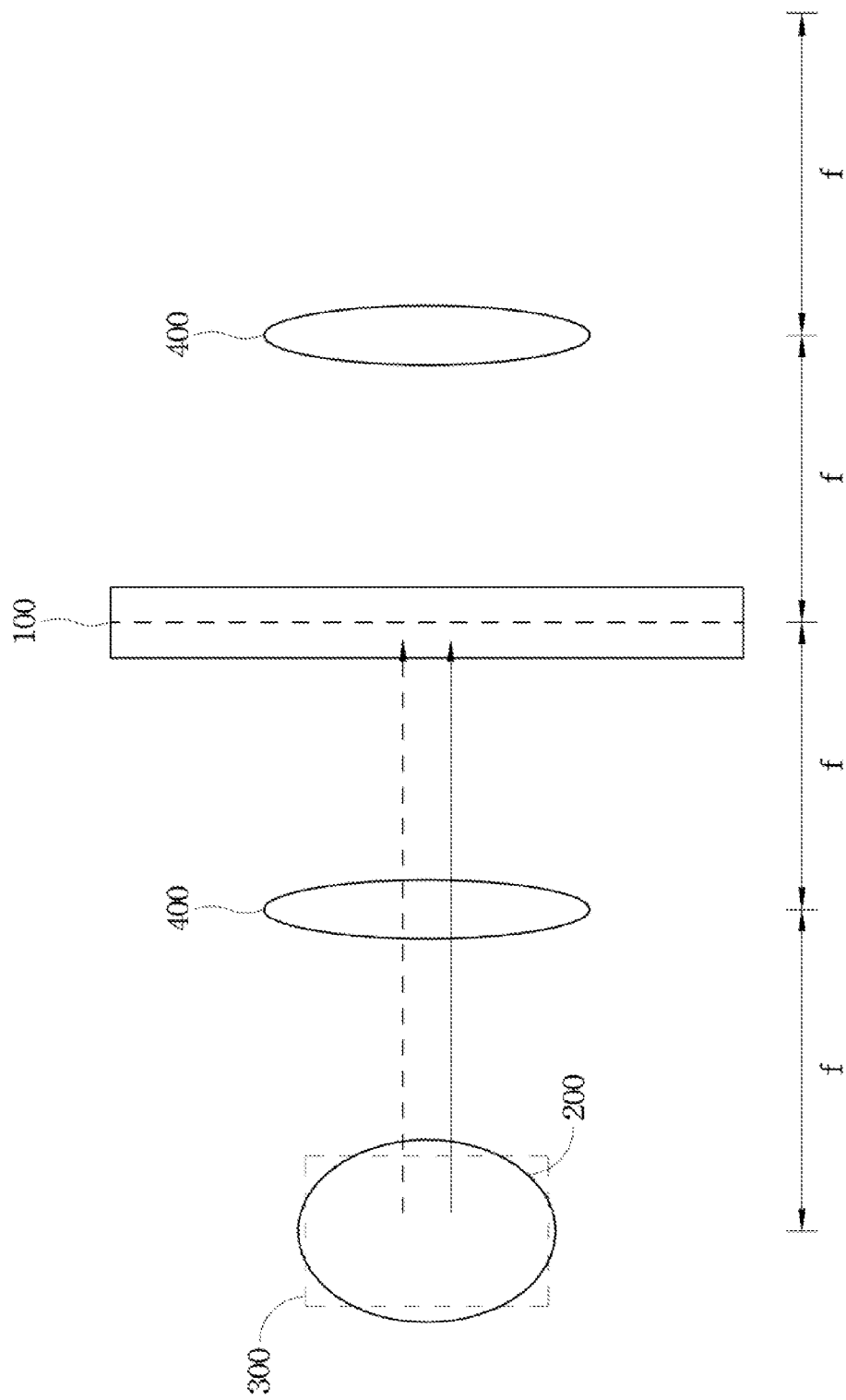
FIG. 2 is a schematic view of the transmission gratings of FIG. 1 when the data is written.

FIG. 2 is a schematic view of the transmission gratings 500 of FIG. 1 when the data is written. When the data is written, the real image of the spatial light modulator (SLM) used to modulate the signal beam 200 and the reference beam 300 locates at the front focal plane of the lens 400, wherein the focal length of the lens 400 is f. The signal beam 200 and the reference beam 300 are collinear. The lens 400 focuses the signal beam 200 and the reference beam 300 onto the collinear holographic storage media 100, thereby creating an interference pattern in the collinear holographic storage media 100.

Figure 3:
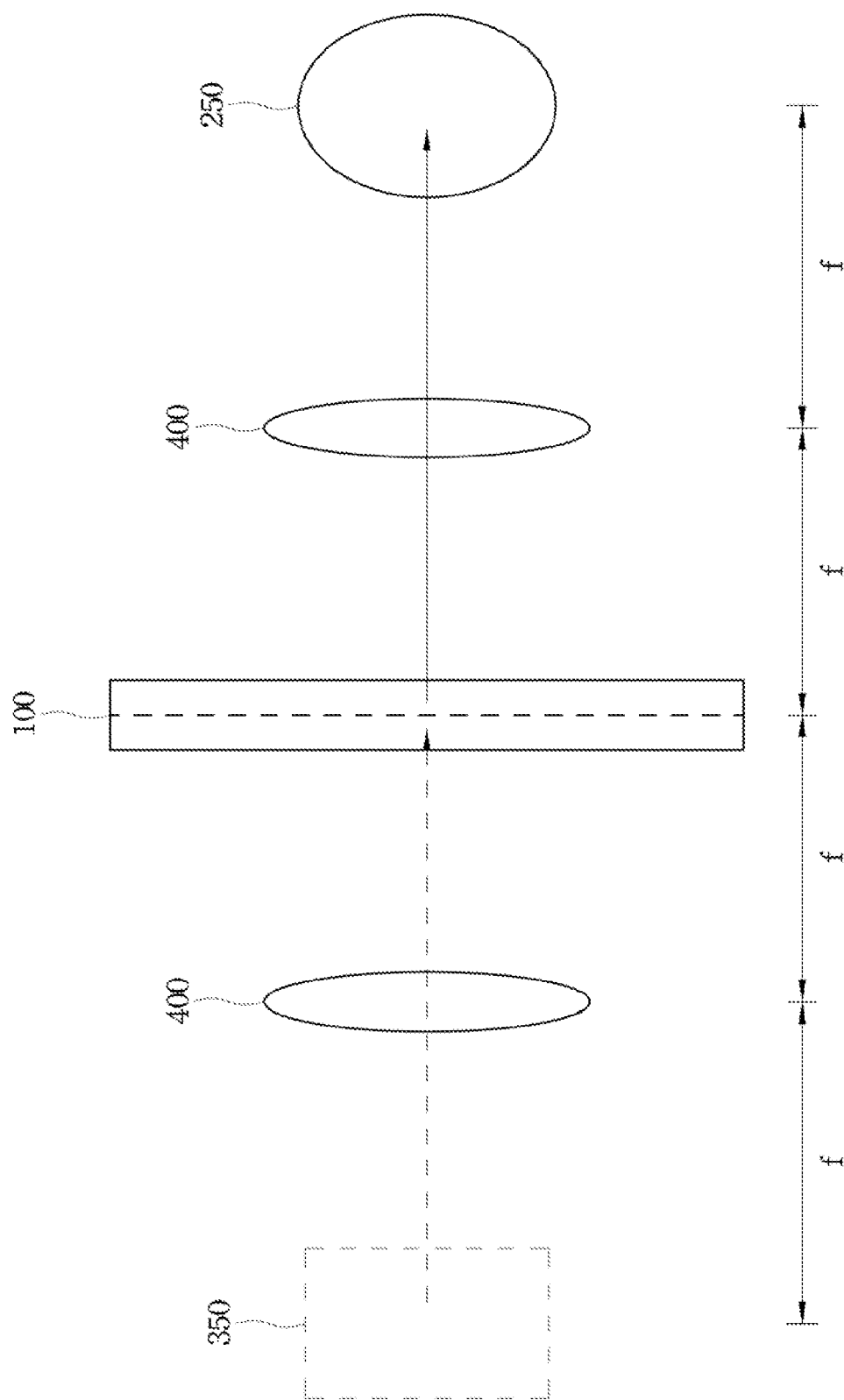
FIG. 3 is a schematic view of the transmission gratings of FIG. 1 when the data is read.

FIG. 3 is a schematic view of the transmission gratings of FIG. 1 when the data is read. When the data is read, the real image of the spatial light modulator (SLM) used to modulate the reading beam 350 locates at the front focal plane of the lens 400, wherein the optical field of the reading beam 350 is substantially the same as the optical field of the reference beam 300. The lens 400 focuses the reading beam 350 onto the collinear holographic storage media 100. Then, the reading beam 350 diffracts on the interference pattern in the collinear holographic storage media 100. The lens 400 projects the diffracted beam 250 onto its front focal plane, thereby forming a real image at its front focal plane. The optical field of the diffracted beam 250 is substantially the same as the optical field of the signal beam 200. The user may use an image sensor to detect the diffracted beam 250, thereby reading the data recorded in the collinear holographic storage media 100.

Figure 4:
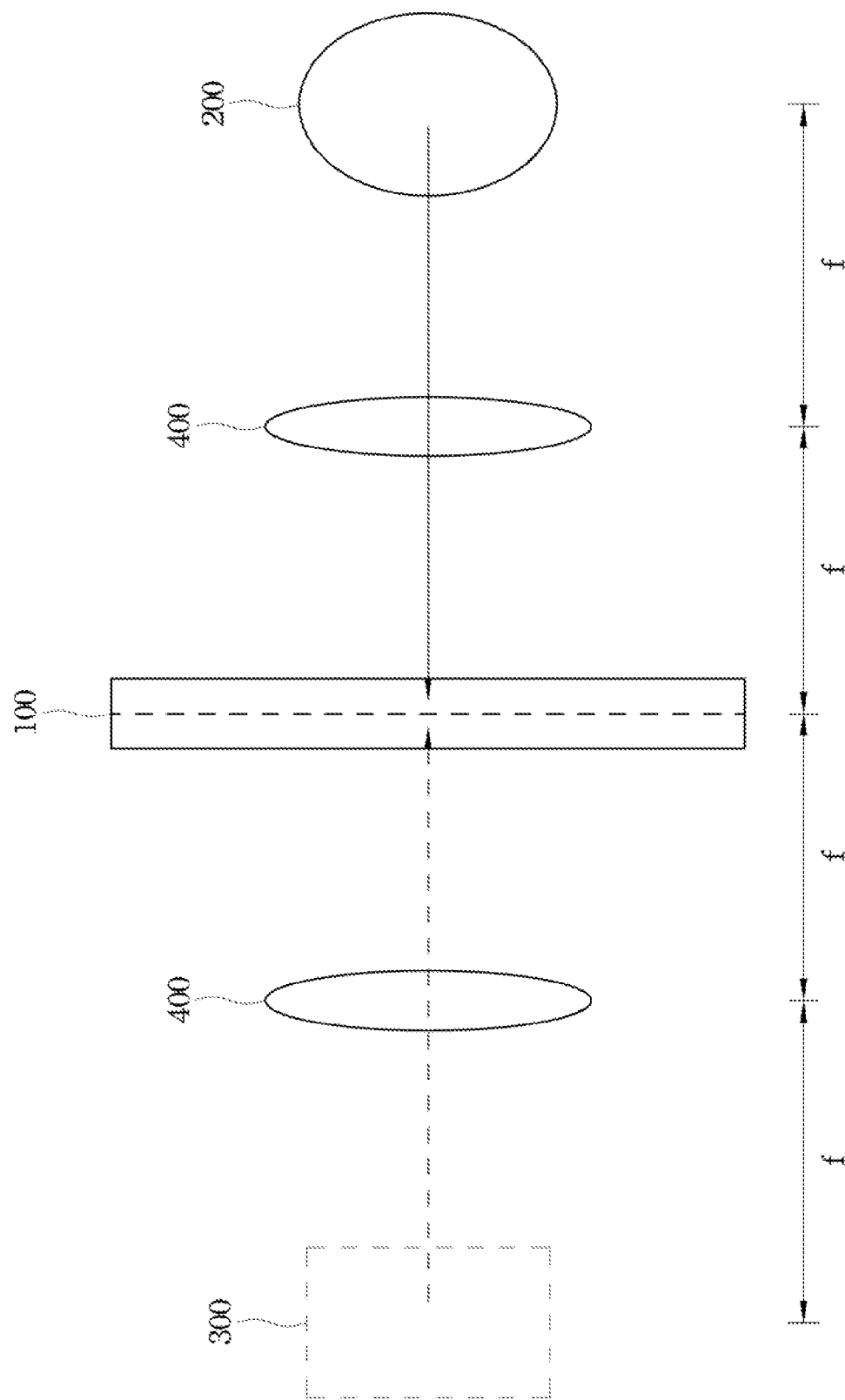
FIG. 4 is a schematic view of the reflection gratings of FIG. 1 when the data is written.

FIG. 4 is a schematic view of the reflection gratings of FIG. 1 when the data is written. The signal beam 200 and the reference beam 300 are collinear but have opposite incident directions. The signal beam 200 and the reference beam 300 illuminate the collinear holographic storage media 100 and thus create an interference pattern in the collinear holographic storage media 100.

Figure 5:
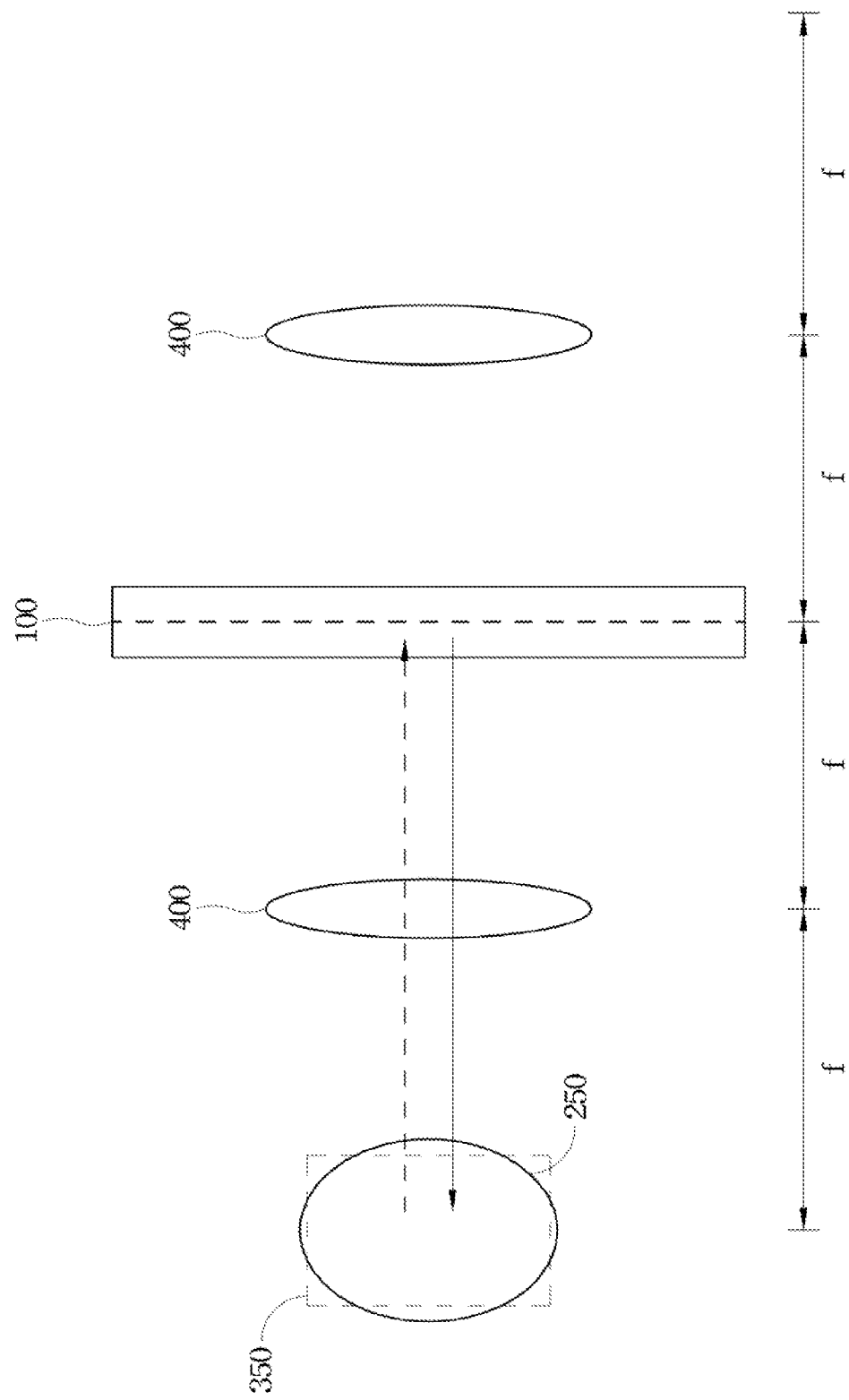
FIG. 5 is a schematic view of the reflection gratings of FIG. 1 when the data is read.

FIG. 5 is a schematic view of the reflection gratings of FIG. 1 when the data is read. When the data is read, the real image of the spatial light modulator (SLM) used to modulate the reading beam 350 locates at the front focal plane of the lens 400, wherein the optical field of the reading beam 350 is substantially the same as the optical field of the reference beam 300. The lens 400 focuses the reading beam 350 onto the collinear holographic storage media 100. Then, the reading beam 350 diffracts on the interference pattern in the collinear holographic storage media 100. The lens 400 reversely projects the diffracted beam 250 onto its front focal plane, thereby forming a real image at its front focal plane. The optical field of the diffracted beam 250 is substantially the same as the optical field of the signal beam 200. The user may use an image sensor to detect the diffracted beam 250, thereby reading the data recorded in the collinear holographic storage media 100.

When both the transmission gratings 500 and the reflection gratings 600 exist, a part of the diffracted beam 250 produced by the transmission gratings 500 and another part of the diffracted beam 250 produced by the reflection gratings 600 have constructive or destructive interference. As a result of the constructive or destructive interference, the total intensity of the diffracted beam 250 is unstable when the temperature of the collinear holographic storage media 100 exceeds a limited operational temperature range. In the worst case, the total intensity of the diffracted beam 250 may drop to near zero. The following embodiments provide a way to eliminate the reflection gratings 600 to enhance the stability of collinear holography.

The applicants establish a paraxial approximation solution of the diffracted beam 250 produced by the collinear holographic storage media 100. According to the paraxial approximation solution of the diffracted beam 250, the applicants identify the source of the part of the diffracted beam 250 produced by the reflection gratings 600. The part of the diffracted beam 250 produced by the reflection gratings 600 can be eliminated due to the temperature difference of the collinear holographic storage media 100 between reading and writing. The following description provides a solution to eliminate the part of the diffracted beam 250 produced by the reflection gratings 600 according to this paraxial approximation solution.

Assuming that the defocus aberration due to the change of the refractive index is compensated by the movement of the collinear holographic storage media 100, i.e. the collinear holographic storage media 100 is moved according to the change of the refractive index when the data is written and/or read, such that the reflection layer 110 of the collinear holographic storage media 100 is located at the back focal plane of the lens 400, the paraxial approximation solution of the diffracted beam 250 produced by the collinear holographic storage media 100 is listed as follows:

$$U_{CCD}\left(\frac{M_\lambda M_x}{M_f}\xi, \frac{M_\lambda M_y}{M_f}\eta\right) =$$

$$\frac{L}{M_z(\lambda f)^2}\left\{e^{jk\frac{4f}{M_f M_\lambda}}\left[U_p\left(\frac{M_x M_\lambda}{M_f}(\xi_2-\xi), \frac{M_y M_\lambda}{M_f}(\eta_2-\eta)\right)\right] \atop U_r^*(\xi_2-\xi_1, \eta_2-\eta_1)U_s(-\xi_1,-\eta_1)\right\}$$
$$\text{sinc}\left(\frac{-L}{2M_z\lambda f^2}\binom{(M_z-M_\lambda M_x^2)\xi_2^2 - 2\xi_2(M_z\xi_1 - M_\lambda M_x^2\xi)}{(M_z-M_\lambda M_y^2)\eta_2^2 - 2\eta_2(M_z\eta_1 - M_\lambda M_y^2\eta)}\right)\right\} +$$

$$\int\int\int\int\left\{e^{jk4f}\left[U_p^*\left(\frac{M_\lambda M_x}{M_f}(\xi_2-\xi), \frac{M_\lambda M_y}{M_f}(\eta_2-\eta)\right)\right] \atop U_r(\xi_2-\xi_1,\eta_2-\eta_1)U_s(-\xi_1,-\eta_1)\right\}$$
$$\text{sinc}\left(\frac{L}{2M_z\lambda f^2}\begin{pmatrix}\frac{L}{M_\lambda}\left(\frac{2}{M_\lambda}-2M_z\right)+\\ 2\xi_2(M_\lambda M_x^2\xi - M_z\xi_1)+\\ 2\eta_2(M_\lambda M_y^2\eta - M_z\eta_1)+\\ \xi_2^2(M_z - M_\lambda M_x^2)+\\ \eta_2^2(M_z - M_\lambda M_y^2)+\\ 2(M_z\xi_1^2 - M_\lambda M_x^2\xi^2)+\\ 2(M_z\eta_1^2 - M_\lambda M_y^2\eta^2)\end{pmatrix}\right)\right\}$$

$$d\xi_1 d\eta_1 d\xi_2 d\eta_2$$

where (1) the refractive index of the recording layer 120 after the change of temperature becomes $M_n$ times that before the change of temperature, the focal length of the lens 400 after the change of temperature becomes $f/M_f$ times that before the change of temperature, and then $M_f = 1/M_n$ (paraxial approximation);

(2) $M_\lambda\lambda$ is the wavelength of light in the recording layer 120, $M_p\lambda$ is the wavelength of the reading beam 350, and then $M_\lambda = M_p/M_n$;

(3) $1/M_x$, $1/M_y$, and $1/M_z$ are the thermal deformation rates of the gratings (including the transmission gratings 500 and the reflection gratings 600) on the x, y, z axes respectively, $G_0(u,v,\Delta z)$ is the gratings before the change of temperature, and then $G_0(M_x u, M_y v, M_z \Delta z)$ is the gratings after the change of temperature;

(4) $\lambda$ is the wavelength of light;

(5) k is the wave number of light;

(6) f is the focal length of the lens 400;

(7) $\Delta Z$ is the distance between the center of the collinear holographic storage media 100 and the back focal plane of the lens 400;

(8) u and v are lateral coordinates of the collinear holographic storage media 100;

(9) $U_s$, $U_r$, and $U_p$ are the optical fields of the signal beam 200, the reference beam 300, and the reading beam 350 at the front focal plane of the lens 400 respectively; and

(10) L is twice the thickness of the collinear holographic storage media 100.

The paraxial approximation solution of the diffracted beam 250 seems complex but represents a clear physical meaning. This physical meaning is specified as followings:

$$U_{CCD}\left(\frac{M_\lambda M_x}{M_f}\xi, \frac{M_\lambda M_y}{M_f}\eta\right) \quad (1)$$

represents the optical field of the diffracted beam 250 after the change of temperature. The optical field of the diffracted beam 250 after the change of temperature on the ζ axis is $$\frac{M_\lambda M_x}{M_f}$$

times that before the change of temperature. The optical field of the diffracted beam 250 after the change of temperature on the η axis is $$\frac{M_\lambda M_y}{M_f}$$

times that before the change of temperature.

(2) The paraxial approximation solution of the diffracted beam 250 has two sets of brace. The terms in the first set of brace represent the optical field of the diffracted beam 250 produced by the transmission gratings 500. The terms in the second set of brace represent the optical field of the diffracted beam 250 produced by the reflection gratings 600.

(3) The optical field of the diffracted beam 250 produced by the reflection gratings 600 has a sinc function. The sinc function has a variable, $$\frac{L}{M_z\lambda}\left(\frac{2}{M_\lambda} - 2M_z\right).$$

Since the thickness of the collinear holographic storage media 100 (L/2) is much larger than the wavelength of light (λ), the optical field of the diffracted beam 250 produced by the reflection gratings 600 has a very limited tolerance to the temperature difference between reading and writing due to the variable, $$\frac{L}{M_z\lambda}\left(\frac{2}{M_\lambda} - 2M_z\right).$$

If the temperature difference between reading and writing exceeds the tolerance, the optical field of the diffracted beam 250 produced by the reflection gratings 600 drops to near zero, and only the optical field of the diffracted beam 250 produced by the transmission gratings 600 is left.

The following description provides a collinear holographic storage method to eliminate the optical field of the diffracted beam 250 produced by the reflection gratings 600.

According to one embodiment of the present invention, a collinear holographic storage method includes the following steps. Data is written into a collinear holographic storage media 100. The data is read from the collinear holographic storage media 100. The temperature of the collinear holographic storage media 100 is controlled such that the writing temperature of the collinear holographic storage media 100 is from between about 5° C. to about 50° C. higher than the reading temperature of the collinear holographic storage media 100.

The foregoing steps are not recited in the sequence in which the steps are performed. That is, unless the sequence of the steps is expressly indicated, the sequence of the steps is interchangeable, and all or part of the steps may be simultaneously, partially simultaneously, or sequentially performed.

The writing temperature of the collinear holographic storage media 100 is is the temperature of the collinear holographic storage media 100 when the data is written into the collinear holographic storage media 100. The reading temperature of the collinear holographic storage media 100 is the temperature of the collinear holographic storage media 100 when the data is read from the collinear holographic storage media 100.

Specifically, the temperature difference of the collinear holographic storage media 100 between reading and writing may be controlled within the range from between about 5° C. to about 50° C. to eliminate the optical field of the diffracted beam 250 produced by the reflection gratings 600.

If the data is read from the collinear holographic storage media 100 at room temperature, the thermal controlling step may include raising the temperature of the collinear holographic storage media 100 to a predetermined temperature when the data is written into the collinear holographic storage media 100. The predetermined temperature may be from between about 5° C. to about 50° C. higher than room temperature.

The term "room temperature" means the ambient temperature without any artificial heating or cooling. Room temperature is usually taken to be 20° C. to 25° C. If room temperature is 25° C., the predetermined temperature is between from between about 30° C. to about 75° C. In one or more embodiments, the predetermined temperature is from between about 45° C. to about 75° C.

The terms "about" as used herein may be applied to modify any quantitative representation which could permissibly vary without resulting in a change in the basic function to which it is related. For example, the predetermined temperature as disclosed herein being from between about 30° C. to about 75° C. may permissibly be less than 30° C. or greater than 75° C. within the scope of the invention if its reflection gratings elimination capability is not materially altered.

Another aspect of the present invention is a collinear holographic storage apparatus.

Figure 6:
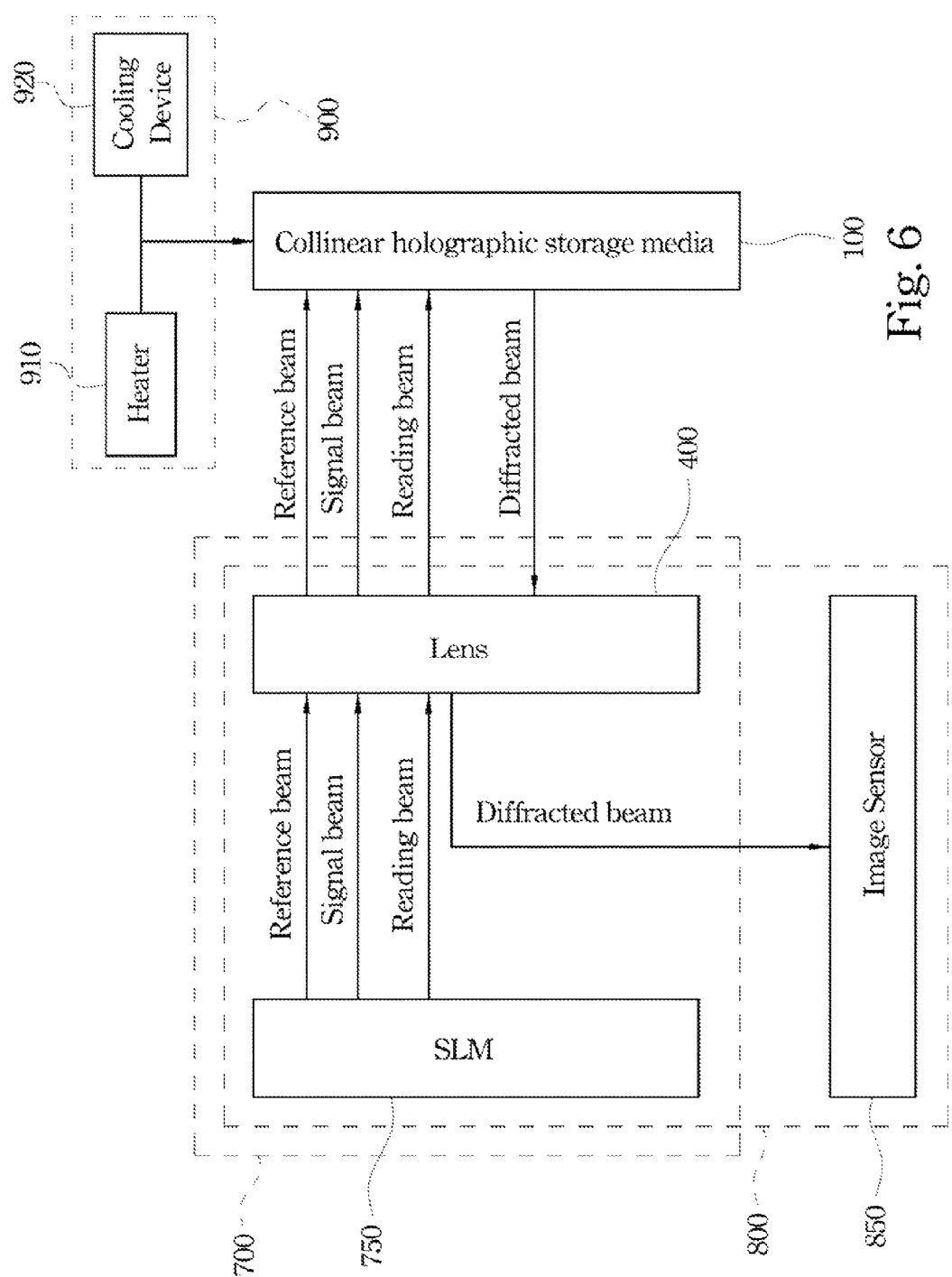
FIG. 6 is a functional block diagram of a collinear holographic storage apparatus according to one embodiment of the present invention.

FIG. 6 is a functional block diagram of a collinear holographic storage apparatus according to one embodiment of the present invention. As shown in FIG. 6, the collinear holographic storage apparatus includes a writing device 700, a reading device 800, and a temperature controlling device 900. The writing device 700 can write data into a collinear holographic storage media 100. The reading device 800 can read the data from the collinear holographic storage media 100. The temperature controlling device 900 can control the temperature difference of the collinear holographic storage media 100 between reading and writing within the range from between about 5° C. to about 50° C.

The writing device 700 includes a spatial light modulator (SLM) 750 and a lens 400. The spatial light modulator (SLM) 750 can provide a reference beam and a signal beam. The reference beam and the signal beam are collinear. The lens 400 focuses the reference beam and the signal beam to create an interference pattern in the collinear holographic storage media 100. The structural and functional details of the writing device 700 can be found in FIGS. 1, 2, and 4 and the related specification text and are not repeated hereinafter.

The reading device 800 includes the spatial light modulator (SLM) 750, the lens 400, and an image sensor 850. The spatial light modulator (SLM) 750 can provide a reading beam. The optical field of the reading beam is substantially the same as the optical field of the reference beam. The lens 400 can focus the reading beam onto the collinear holographic storage media 100 such that the reading beam diffracts on the interference pattern of the collinear holographic storage media 100. The image sensor 850 can detect the diffracted beam, thereby reading the data recorded in the collinear holographic storage media 100. The structural and functional details of the reading device 800 can be found in FIG. 3 and FIG. 5 and the related specification text and are not repeated hereinafter.

If the data is read from the collinear holographic storage media 100 at room temperature, the temperature controlling device 900 may include a heater 910 to raise the temperature of the collinear holographic storage media 100 to a predetermined temperature when the data is written into the collinear holographic storage media 100. The predetermined temperature may be from between about 5° C. to about 50° C. higher than room temperature. If room temperature is 25'C., the predetermined temperature is from between about 30° C. to about 75° C. In one or more embodiments, the predetermined temperature is from between about 45° C. to about 75° C.

It is appreciated that many other devices may be used as the temperature controlling device 900, for instance, a cooling device 920 may be used to lower the temperature of the collinear holographic storage media 100 to a predetermined temperature when the data is written into the collinear holographic storage media 100. The predetermined temperature may be from between about 5° C. to about 50° C. lower than room temperature. If room temperature is 25° C., the predetermined temperature is from between about −25° C. to about 20° C. In one or more embodiments, the predetermined temperature is from between about −25° C. to about 5° C.

Alternatively, the temperature controlling device 900 may be the combination of the heater 910 and the cooling device 920. In use, the temperature controlling device 900 can control the temperature difference of the collinear holographic storage media 100 between reading and writing within the range from between about 5° C. to about 50° C.

A series of computer simulations were run to determine the elimination of the part of the diffracted beam produced by the reflection gratings. The parameters described before are not repeated hereinafter, and only further information is supplied to actually perform the series of computer simulations.

Figure 7:
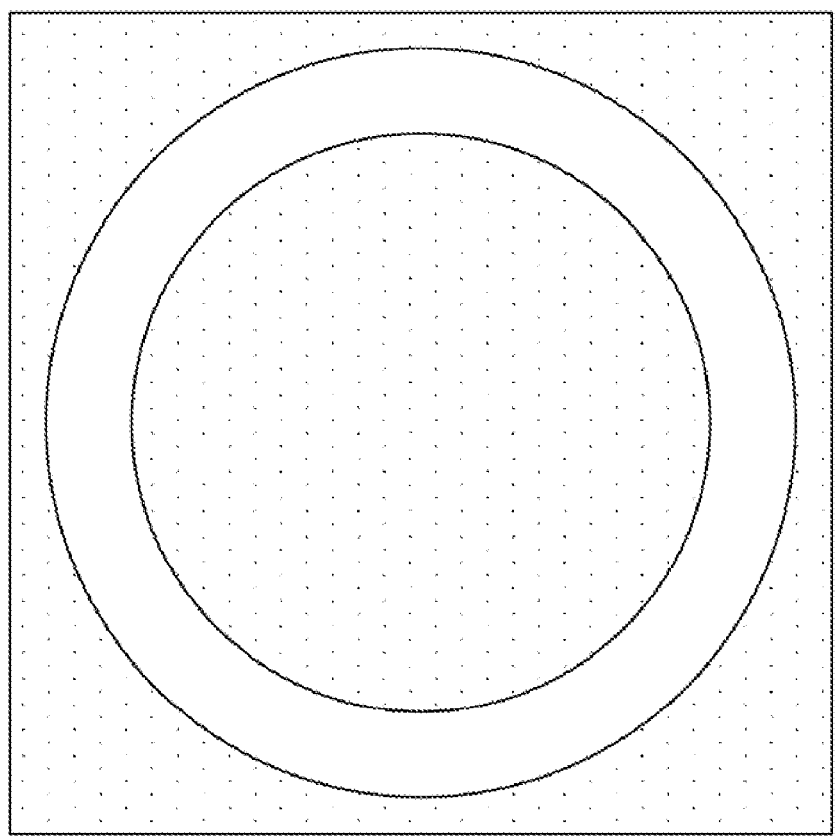
FIG. 7 is a schematic view of a reference beam according to one example of the present invention.

In the series of computer simulations, the signal beam is from a point source at the origin. The wavelength of the signal beam is 408 nm. The focal length of the lens is 4 mm. The thickness of the collinear holographic storage media is 0.5 mm. The refractive index of the collinear holographic storage media is 1.5. Each pixel of the spatial light modulator (SLM) has an edge length of 13.68 μm. The number of the pixels of the spatial light modulator (SLM) is 321×321. The reference beam is not modulated. The reference beam is schematically shown in FIG. 7. The inner diameter of the reference beam is 71.4% the length of the spatial light modulator (SLM). The outer diameter of the reference beam is 93.8% the length of the spatial light is modulator (SLM). The fill factor of each pixel of the spatial light modulator (SLM) is 100%.

Figure 8:
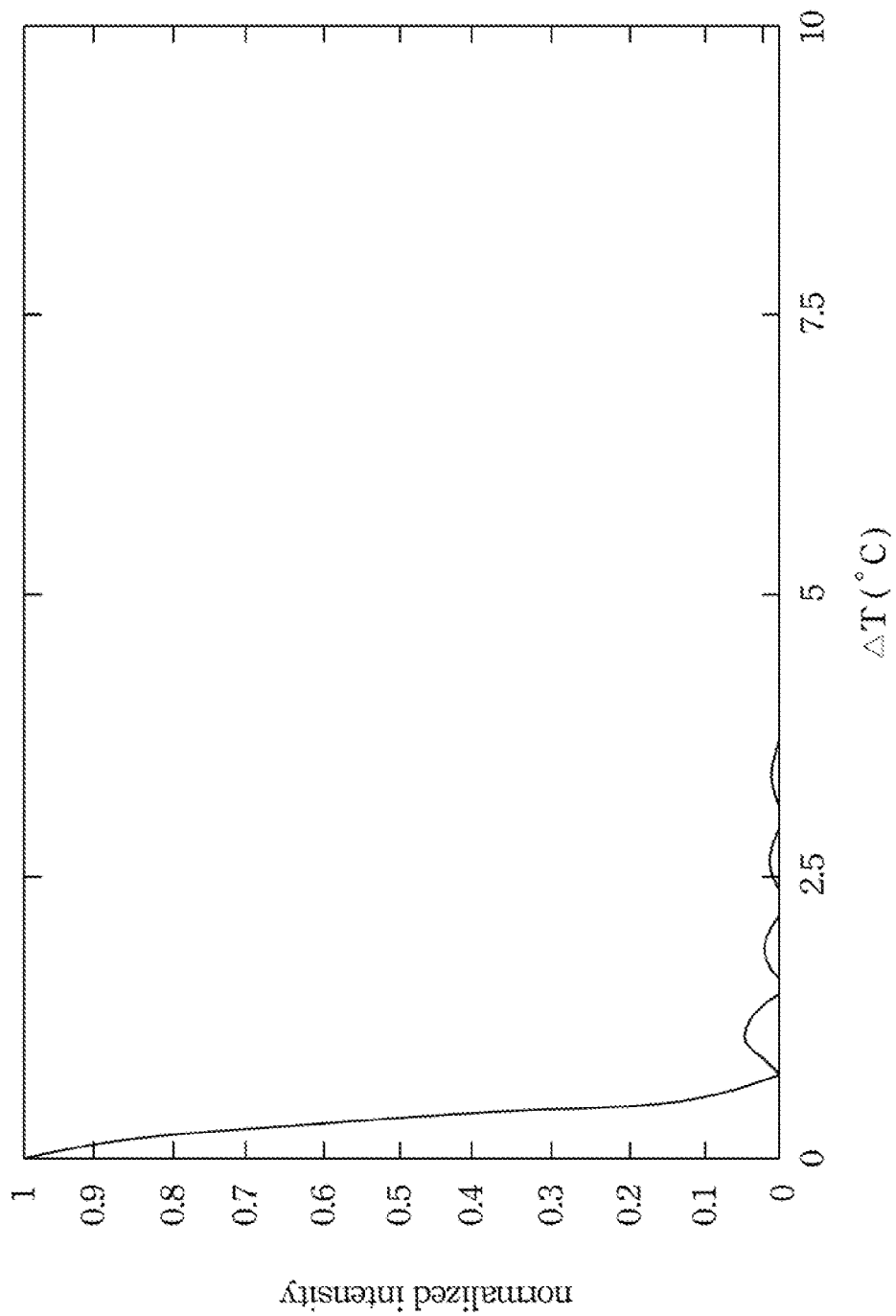
FIG. 8 is a graph of the normalized intensity of a part of the diffracted beam produced by the reflection gratings against the temperature difference of the collinear holographic storage media between reading and writing.

The results of the computer simulations are shown in FIG. 8. FIG. 8 is a graph of the normalized intensity of the part of the diffracted beam produced by the reflection gratings against the temperature difference of the collinear holographic storage media between reading and writing.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims is not intended to invoke the provisions of 35 U.S.C. §112, 6th paragraph.

What is claimed is:

1. A collinear holographic storage method comprising:
   writing data into a collinear holographic storage media;
   reading the data from the collinear holographic storage media; and
   controlling the temperature of the collinear holographic storage media such that the writing temperature of the collinear holographic storage media is from between about 5° C. to about 50° C. higher than the reading temperature of the collinear holographic storage media.

2. The collinear holographic storage method of claim 1, wherein controlling the temperature of the collinear holographic storage media comprises:
   raising the temperature of the collinear holographic storage media to a temperature of from between about 30° C. to about 75° C. when the data is written into the collinear holographic storage media.

3. The collinear holographic storage method of claim 1, wherein controlling the temperature of the collinear holographic storage media comprises:
   raising the temperature of the collinear holographic storage media to a temperature of from between about 45° C. to about 75° C. when the data is written into the collinear holographic storage media.

4. A collinear holographic storage apparatus comprising:
   a writing device for writing data into a collinear holographic storage media;
   a reading device for reading the data from the collinear holographic storage media; and
   means for controlling the temperature difference of the collinear holographic storage media between reading and writing within the range from between about 5° C. to about 50° C.

5. The collinear holographic storage apparatus of claim 4, wherein the controlling means comprises:
   means for raising the temperature of the collinear holographic storage media to a temperature of from between about 5° C. to about 50° C. higher than room temperature when the data is written into the collinear holographic storage media.

6. The collinear holographic storage apparatus of claim 4, wherein the controlling means comprises:
   means for raising the temperature of the collinear holographic storage media to a temperature of from between about 30° C. to about 75° C. when the data is written into the collinear holographic storage media.

7. The collinear holographic storage apparatus of claim 4, wherein the controlling means comprises:
   means for raising the temperature of the collinear holographic storage media to a temperature of from between about 45° C. to about 75° C. when the data is written into the collinear holographic storage media.

8. The collinear holographic storage apparatus of claim 4, wherein the controlling means comprises:
   means for lowering the temperature of the collinear holographic storage media to a temperature of from between about 5° C. to about 50° C. lower than room temperature when the data is written into the collinear holographic storage media.

9. The collinear holographic storage apparatus of claim 4, wherein the controlling means comprises:
    means for lowering the temperature of the collinear holographic storage media to a temperature of from between about −25° C. to about 20° C. when the data is written into the collinear holographic storage media.

10. The collinear holographic storage apparatus of claim 4, wherein the controlling means comprises:
    means for lowering the temperature of the collinear holographic storage media to a temperature of from between about −25° C. to about 5° C. when the data is written into the collinear holographic storage media.

11. The collinear holographic storage apparatus of claim 4, wherein the controlling means comprises:
    a heater for raising the temperature of the collinear holographic storage media when the data is written into the collinear holographic storage media.

12. The collinear holographic storage apparatus of claim 4, wherein the controlling means comprises:
    a cooling device for lowering the temperature of the collinear holographic storage media when the data is written into the collinear holographic storage media.

13. The collinear holographic storage apparatus of claim 4, wherein the controlling means comprises:
    a heater for raising the temperature of the collinear holographic storage media; and
    a cooling device for lowering the temperature of the collinear holographic storage media.

14. The collinear holographic storage apparatus of claim 4, wherein the writing device comprises:
    a spatial light modulator for providing a reference beam and a signal beam, wherein the reference beam and the signal beam are collinear; and
    a lens for focusing the reference beam and the signal beam to create an interference pattern in the collinear holographic storage media.

15. The collinear holographic storage apparatus of claim 4, wherein the reading device comprises:
    a spatial light modulator for providing a reading beam;
    a lens for focusing the reading beam onto the collinear holographic storage media such that the reading beam diffracts on the interference pattern of the collinear holographic storage media; and
    an image sensor for detecting the diffracted beam.

\* \* \* \* \*

UNITED STATES PATENT AND TRADEMARK OFFICE
CERTIFICATE OF CORRECTION

PATENT NO.       : 8,116,186 B2
APPLICATION NO.  : 12/862743
DATED            : February 14, 2012
INVENTOR(S)      : Ching-Cherng Sun and Yeh-Wei Yu It is certified that error appears in the above-identified patent and that said Letters Patent is hereby corrected as shown below:

In the Specifications:

The formula appearing In column 4, lines 5-31 of the issued patent should be changed to the formula as it is shown in the attachment filed with this request.

Signed and Sealed this
Twenty-third Day of April, 2013

Teresa Stanek Rea
*Acting Director of the United States Patent and Trademark Office*

$$U_{CCD}\left(\frac{M_\lambda M_x}{M_f}\xi, \frac{M_\lambda M_y}{M_f}\eta\right) =$$

$$\frac{L}{M_z(\lambda f)^2}\iiiint \left\{ \begin{bmatrix} e^{jk\frac{4f}{M_f M_\lambda}} \begin{bmatrix} U_p\left(\frac{M_x M_\lambda}{M_f}(\xi_2-\xi), \frac{M_y M_\lambda}{M_f}(\eta_2-\eta)\right) \\ U_r^*(\xi_2-\xi_1, \eta_2-\eta_1)U_s(-\xi_1,-\eta_1) \end{bmatrix} \\ \mathrm{sinc}\left( \frac{-L}{2M_z\lambda f^2}\begin{pmatrix} (M_z - M_\lambda M_x^2)\xi_2^2 \\ -2\xi_2(M_z\xi_1 - M_\lambda M_x^2\xi) \\ +(M_z - M_\lambda M_y^2)\eta_2^2 \\ -2\eta_2(M_z\eta_1 - M_\lambda M_y^2\eta) \end{pmatrix}\right) \end{bmatrix} + \right.$$

$$\left. \begin{bmatrix} e^{jk4f}\begin{bmatrix} U_p^*\left(\frac{M_\lambda M_x}{M_f}(\xi_2-\xi), \frac{M_\lambda M_y}{M_f}(\eta_2-\eta)\right) \\ U_r(\xi_2-\xi_1, \eta_2-\eta_1)U_s(-\xi_1,-\eta_1) \end{bmatrix} \\ \mathrm{sinc}\begin{pmatrix} \frac{L}{M_z\lambda}\left(\frac{2}{M_\lambda} - 2M_z\right) + \\ \frac{L}{2M_z\lambda f^2}\begin{pmatrix} 2\xi_2(M_\lambda M_x^2\xi - M_z\xi_1) \\ +2\eta_2(M_\lambda M_y^2\eta - M_z\eta_1) \\ +\xi_2^2(M_z - M_\lambda M_x^2) \\ +\eta_2^2(M_z - M_\lambda M_y^2) \\ +2(M_z\xi_1^2 - M_\lambda M_x^2\xi^2) \\ +2(M_z\eta_1^2 - M_\lambda M_y^2\eta^2) \end{pmatrix} \end{pmatrix} \end{bmatrix} \right\} d\xi_1 d\eta_1 d\xi_2 d\eta_2$$